Patented Sept. 25, 1934

1,974,704

UNITED STATES PATENT OFFICE 1,974,704

PROCESS OF FROTH FLOTATION

Ira H. Derby and Orin D. Cunningham, Indianapolis, Ind., assignors to Peter C. Reilly, Indianapolis, Ind.

No Drawing. Application February 12, 1931, Serial No. 515,400

6 Claims. (Cl. 209—166)

The present invention relates to improvements in ore flotation, including the flotation of sulfide ores, and other metalliferous material, by the use of "nuclear phosphorous compounds" containing sulfur, that is, compounds structurally consisting of groups of atoms (or radicals) united to one or more phosphorus atoms as a nucleus, which compounds also contain sulfur. The invention is based upon our observation that certain compounds as described herein which structurally consist of phosphorus as a nucleus to which other groups of atoms (radicals) are attached, and which contain sulfur, function as collecting agents and constitute a class of compounds that has not heretofore been used in the art of flotation.

The present application is in part a continuation of our copending application Serial No. 96,061 filed March 16, 1926 (now Patent No. 1,812,839, June 30, 1931).

More particularly, our present invention embraces ore flotation while using reagents containing products of reaction of phosphorus sulfides (such as the trisulfide, $P_2S_3$, or pentasulfide, $P_2S_5$), with tar acids or constituents thereof.

The reactions of the phosphorus sulfides, for example, phosphorus pentasulfide, $P_2S_5$, with tar acids may result in the formation of a single chemical substance with two or more phosphorus atoms as a nucleus of the molecular structure; or there may be a splitting of the molecule of the phosphorus sulfide compound to yield two or more products each containing one or more nuclear phosphorus atoms; or the reaction may or may not involve the elimination of some of the sulfur of the phosphorus sulfide in the form of hydrogen sulfide by the substitution of groups of atoms (radicals), the resulting product or products being characterized, however, by the presence of a nuclear phosphorus atom or atoms and the presence of sulfur in the molecular structure.

The phosphosulfo compounds above referred to possess a very high selective action (or collecting power) for metalliferous materials, such as sulfide minerals, in mineral froth flotation operations. Pine oil and tar acids constitute suitable frothing agents that may be employed in conjunction therewith.

These phosphosulfo compounds can be used either alone or mixed with other oily materials having flotation value, or with solvent agents or mixtures of the same.

It is not necessary that chemically pure substances be used since the unrefined products can be employed with metallurgical results equally good to those obtained with pure substances, cept that it is preferable to use anhydrous materials.

Generally stated, it is sufficient to select the desired tar acid or tar acid constituent, and to react thereupon with phosphorus pentasulfide or other sulfide of phosphorus, the reaction being performed in a suitable container, and at a temperature sufficiently high to cause the desired reaction to take place.

For the preparation of the phosphosulfo compounds referred to we give the following specific example:—

One part of powdered phosphorus pentasulfide $P_2S_5$, is slowly mixed with 2–3 parts of ordinary tar acids and the mixture may be heated, if desired, to 100° C. or thereabout, with constant stirring, and maintained at this temperature until the $P_2S_5$ has reacted with the tar acids to an extent that it passes into solution. The product is a transparent syrupy liquid. The amount of tar acids used may be varied arbitrarily so long as there is sufficient tar acid present to react with the $P_2S_5$ and leave the reaction product in a liquid condition. If tar acid is used as the frothing agent in the flotation operation, the $P_2S_5$ may be combined with the tar acids in such a proportion as to form a reagent combining both frothing and collecting properties.

The proportion of tar acids in the above example corresponds to an excess over that required for the reaction with phosphorus pentasulfide, the excess of tar acids acting as a solvent or reaction medium which may be recovered, if so desired, by distillation, preferably by vacuum distillation, since continued heating at elevated temperature carries the reaction too far.

We do not limit our claims to the proportions or quantities of materials as given in the above example.

The general procedure indicated in the above example may be applied in chemically combining phosphorus pentasulfide with any tar acid or constituent thereof. In some instances heat may be applied to bring about the desired chemical combination, and in other cases the reaction mixture may desirably be cooled to carry on the reaction in the cold (i. e. at about normal room temperature).

The product obtained by the reaction of tar acids with phosphorus pentasulfide, as illustrated in the above example, was employed in the flotation of a copper sulfide ore of the Utah Copper Company (containing some copper oxides and analyzing about 0.9% copper) in the ratio of one tenth pound of product per ton of dry ore; tar acids as a frothing agent and a lime circuit being employed in conjunction therewith. The ore was subjected to the ordinary flotation operation in a mechanical agitation type of flotation machine and a tailing analyzing 0.06% copper was obtained, together with a high grade concentrate analyzing about 20% copper, corresponding to a recovery of about 95% of the copper value in the ore under treatment.

In other examples we have used both smaller and larger amounts of tar acid phosphosulfo compounds, in the flotation of ores, with satisfactory results, and we have also used tar acid phosphosulfo compounds both alone and with other flotation agents, with very satisfactory results. Furthermore, we do not limit our conditions for carrying out a flotation operation to those included in the above example, but may use any type of flotation machine, as for example, the Callow cell, or, instead of an alkaline circuit, we may use a normal or acid circuit.

In the present case we have described the use of tar acids or constituents thereof derivable from coal tars as substances to react with phosphorus sulfides to form a flotation reagent. The expression "tar acids", as used here, refers to that portion of a coal tar extractable with a caustic soda solution.

What is claimed:

1. In the art of froth flotation, the herein described step of subjecting metalliferous material to froth flotation in the presence of a product produced at a temperature not substantially above 100° C., by reaction of phosphorus sulfide with a tar acid.

2. In the art of froth flotation, the herein described step of subjecting metalliferous material to froth flotation in the presence of a reaction product produced at about 100° C., by reacting phosphorus pentasulfide ($P_2S_5$) with a tar acid.

3. In the art of froth flotation, the herein described step of subjecting metalliferous material to froth flotation in the presence of a reaction product formed by reacting at not substantially above 100° C., upon phosphorus pentasulfide ($P_2S_5$) with a tar acid constituent.

4. A process which comprises subjecting metalliferous material to froth flotation while associated with a product produced by reacting in the cold, with a phosphorus sulfide upon a tar acid constituent.

5. A process which comprises reacting a phosphorus sulfide with at least one of the constituents of a tar acid at well below 100° C., adding the product to an ore material and subjecting the mixture to froth-flotation.

6. A process which comprises reacting a phosphorus sulfide with a tar acid at well below 100° C., adding the reaction product to a metalliferous material containing sulfide and subjecting the mixture to froth flotation.

IRA H. DERBY.
ORIN D. CUNNINGHAM.